(No Model.) 2 Sheets—Sheet 1.

S. D. SHEPPERD.
CLUTCH FOR ROTARY FANS.

No. 449,888. Patented Apr. 7, 1891.

WITNESSES:

INVENTOR:
S. D. Shepperd
BY
ATTORNEYS.

(No Model.) 2 Sheets—Sheet 2.
S. D. SHEPPERD.
CLUTCH FOR ROTARY FANS.
No. 449,888. Patented Apr. 7, 1891.
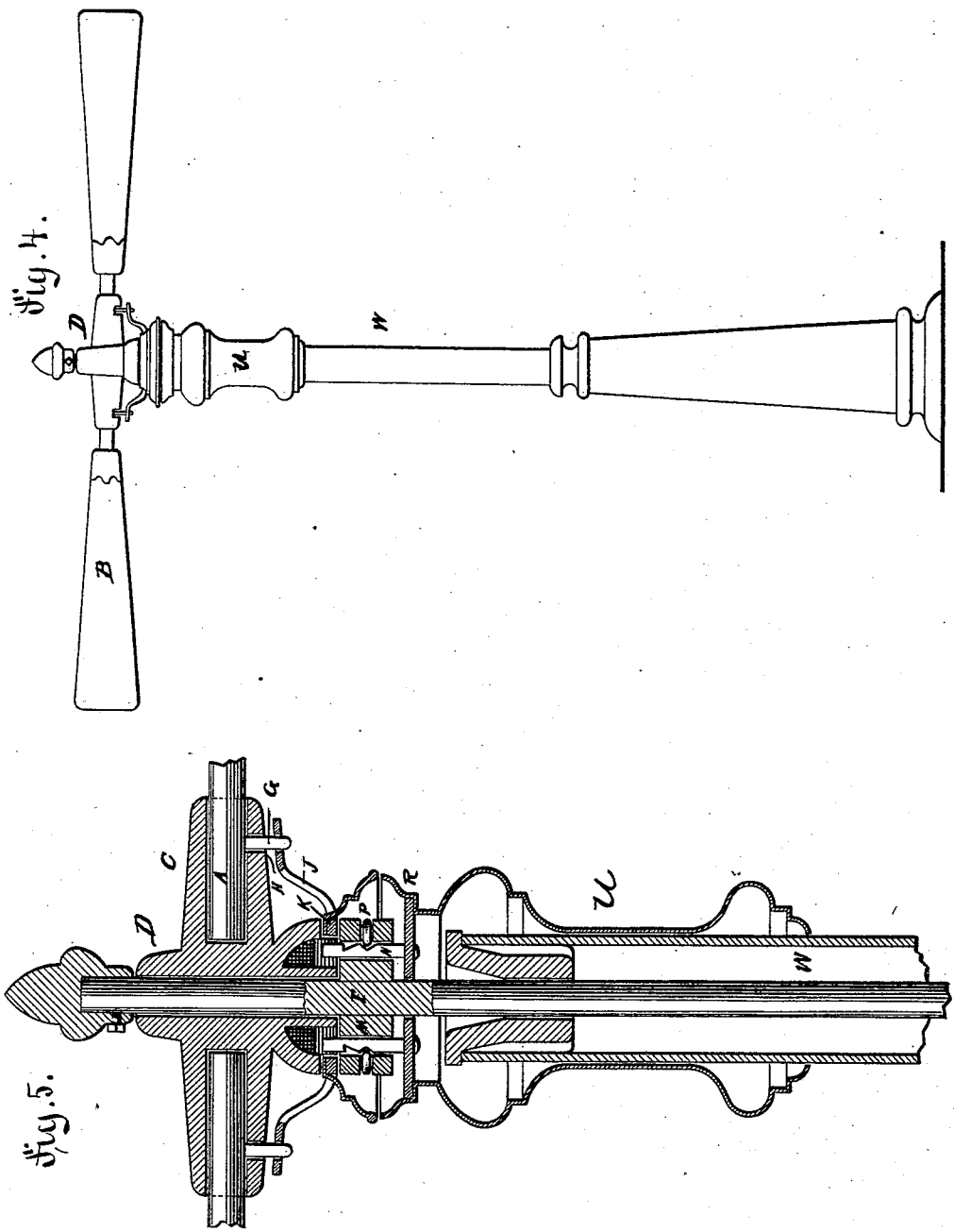
WITNESSES:
INVENTOR:
S. D. Shepperd
BY
ATTORNEYS

UNITED STATES PATENT OFFICE.

SYLVANUS D. SHEPPERD, OF NEWARK, NEW JERSEY, ASSIGNOR TO THE BACKUS WATER MOTOR COMPANY, OF SAME PLACE.

CLUTCH FOR ROTARY FANS.

SPECIFICATION forming part of Letters Patent No. 449,888, dated April 7, 1891.

Application filed December 11, 1890. Serial No. 374,325. (No model.)

*To all whom it may concern:*

Be it known that I, SYLVANUS D. SHEPPERD, of Newark, in the county of Essex, in the State of New Jersey, a citizen of the United States, have invented certain new and useful Improvements in Clutches for Rotary Fans, of which the following is a specification.

This invention relates to improvements in clutches for starting or stopping rotary fans; and the object of my invention is to provide a clutch which is simple in construction and by means of which the fan can be started or stopped very easily and rapidly and the inclination of the fan-blades changed at will.

The invention consists in a rotary fan having the shanks for the fan-wings mounted to turn in the sockets of the hub-pins projecting from said shanks, and a ring mounted on the hub and having arms engaging said pins, whereby by turning said ring on the hub the fan-wing shanks are rotated on the longitudinal axis, and thus the inclination of the wings is adjusted.

The invention further consists in the combination, with a rotary shaft, of a hub mounted loosely on the same and provided with fan-wing sockets with recesses in its bottom, a collar on the shaft, sliding pins passing through said collar and adapted to pass into the recesses in the bottom of the hub, a plate to which the said pins are secured, and a retaining-wing for said pins in the collar.

The invention also consists in the construction and combination of parts and details, which will be fully described hereinafter, and finally pointed out in the claims.

Figure 1:
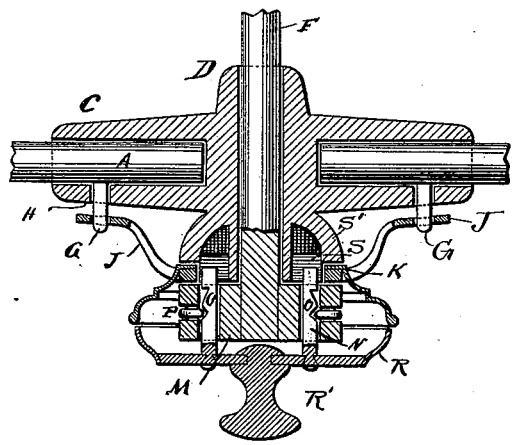
Figure 2:
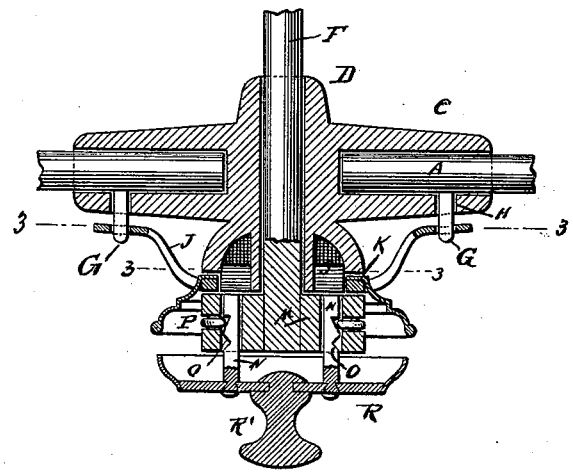
Figure 3:
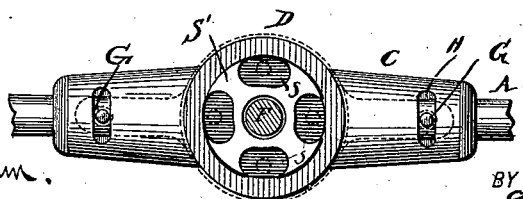

In the accompanying drawings, Figure 1 is a vertical transverse view of my improved clutch, showing it in the position which it has when the fan is operated. Fig. 2 is a similar view showing it disengaged. Fig. 3 is a horizontal sectional view from the bottom on the line 3 3, Fig. 2. Fig. 4 is an elevation of a column-fan provided with my improved clutch, and Fig. 5 is an enlarged detail vertical transverse sectional view of the clutch mechanism on a column-fan.

Similar letters of reference indicate corresponding parts.

The shanks A of the fan-wings B are mounted to turn in the sockets C and project radially from the hub D, mounted loosely on the rotary shaft F, which shaft is rotated by any suitable means, such as a belt, pulley, or gearing. Each stem or shank A is provided with a pin G, projecting through a transverse slot H in the corresponding socket C, and each pin G passes through an aperture in the end of an arm J of a ring K, mounted to turn on the lower end of the hub D. By turning said ring K the arms J change the inclination of the pins G, thereby turning the shanks A on their longitudinal axes within the socket C and thereby changing the inclination of the wings. A collar M is secured on the lower end of the shaft D and mounted to turn so as to rotate with the same. Through apertures in said collar a series of pins N pass, each having two notches O, into which a spring-ring P, held in a circumferential groove of the collar M, can snap. The lower ends of the said pins N are secured to a plate R, provided with the handle-knob R', projecting from the bottom of the same. In the bottom of the hub D a series of recesses S are formed by radial partitions S', into which recesses the upper ends of the pins N can pass.

When the parts are in the position shown in Fig. 2, the pins N are withdrawn and their upper ends do not project above the top of the collar M, and consequently do not engage the partitions S' in the bottom of the hub. The pins are held in this position on the spring-ring P, engaging the upper notches O. The fan is now not in operation.

When the fan is to be started, the plate R is pushed forward until the spring-ring P snaps into the lower notches of the pins N, locking them in raised position, as shown in Fig. 1. When the pins are in this position, their upper ends are in the recesses S in the bottom of the hub, and acting on the partitions S' in the bottom of the hub rotate the same as the collar M, through which the pins N pass, is rotated from the shaft F.

The construction shown in Figs. 1 and 2 is adapted for hanging fans. For column-fans the construction is similar, as shown in Fig. 5. The shaft F passes through the column W, and on its upper end the hub D is loosely mounted. On said shaft F the collar M is fixed, and the plate R, carrying the pins N, is secured to the upper end of a sliding handle-piece U, mounted loosely on the column. By grasping said handle-piece the pins N can be moved up or down, according as the fan is to be rotated or stopped.

Having thus described my invention, I claim as new and desire to secure by Letters Patent—

1. The combination, with a hub having radial sockets, of fan-blades having shanks which are mounted to turn in said sockets, a pin projecting from each shank through a slot in its socket, and a ring mounted to turn on the hub and having arms projecting radially and provided with longitudinal apertures near their ends, through which apertures the shanks pass for the purpose of adjusting the inclination of the wings, substantially as set forth.

2. In a rotary fan, the combination of a hub having radial sockets for the shanks and recesses in its lower end, a shaft, a collar fixed on said shaft and provided with vertical apertures, notched pins projecting through said apertures, a vertically-sliding plate to which said pins are attached, and a spring device embedded in the fixed collar and adapted to engage the pins and to lock them in raised or lowered position, the upper ends of said pins being adapted to pass into the notches in the lower end of the hub, substantially as set forth.

3. In a rotary fan, the combination of a hub having sockets in the ends of the shanks for the fan-wings and also provided on its lower end with a ring loosely surrounding the bottom of said hub and provided with arms, pins projecting from the fan-wing shanks through slots in the sockets into said arms, a collar on the rotary shaft, which collar is provided with apertures, notched pins passing through said apertures, their lower ends being adapted to pass into the notches in the bottom of the hub, a plate to which said pins are secured, and a spring locking device on the collar for locking the pins in raised or lowered position, substantially as set forth.

In testimony that I claim the foregoing as my invention I have signed my name in presence of two subscribing witnesses.

SYLVANUS D. SHEPPERD.

Witnesses:
   CHAS. TRAUDT,
   JOSEPH K. FRANKS.